United States Patent
Yao

(10) Patent No.: US 9,700,921 B2
(45) Date of Patent: Jul. 11, 2017

(54) METHOD OF CLEANING SUBSTRATE BY ULTRAVIOLET RAYS WITH ADJUSTABLE RADIATION ENERGY

(71) Applicant: Shenzhen China Star Optoelectronics Technology Co., Ltd., Shenzhen, Guangdon (CN)

(72) Inventor: Jiangbo Yao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 290 days.

(21) Appl. No.: 14/381,200

(22) PCT Filed: Jun. 12, 2014

(86) PCT No.: PCT/CN2014/079708
§ 371 (c)(1),
(2) Date: Aug. 26, 2014

(87) PCT Pub. No.: WO2015/176336
PCT Pub. Date: Nov. 26, 2015

(65) Prior Publication Data
US 2016/0228928 A1    Aug. 11, 2016

(30) Foreign Application Priority Data

May 21, 2014 (CN) .......................... 2014 1 0216997

(51) Int. Cl.
*B08B 7/00* (2006.01)
*B08B 13/00* (2006.01)
(Continued)

(52) U.S. Cl.
CPC ............. *B08B 7/0057* (2013.01); *B08B 13/00* (2013.01); *G02F 1/1368* (2013.01); *G02F 2001/1316* (2013.01); *G02F 2001/133302* (2013.01)

(58) Field of Classification Search
CPC ..... B08B 5/043; B08B 7/0035; B08B 7/0057; C03C 23/002; C03C 23/0075; H01L 21/67028; H01L 21/67115
See application file for complete search history.

(56) References Cited

U.S. PATENT DOCUMENTS 5,983,909 A * 11/1999 Yeol .................... B01F 3/04985
                                                                   134/102.1
6,191,428 B1 * 2/2001 Gilberti .................... A61L 2/10
                                                                   250/493.1
(Continued)

FOREIGN PATENT DOCUMENTS

CN          201794490 U       4/2011
CN          103406302 A      11/2013

*Primary Examiner* — David Cormier
(74) *Attorney, Agent, or Firm* — Andrew C. Cheng

(57) ABSTRACT

The present invention is related with a method of cleaning a substrate by ultraviolet rays with adjustable radiation energy, comprising steps of: providing an ultraviolet ray light (10) and a substrate (20) to be cleaned with the ultraviolet rays; locating several shading plates (30) between the ultraviolet ray light (10) and the substrate (20) to be cleaned with the ultraviolet rays; rotating the shading plates (30) to adjust an area of the substrate (20) irradiated with the ultraviolet rays emitted by the ultraviolet ray light (10) and thus to control the radiation energy on the substrate (20) in the unit time; cleaning the substrate (20) with the ultraviolet rays emitted by the ultraviolet ray light (10). With the method, the radiation energy of the ultraviolet rays for cleaning the substrate can be flexibly adjusted. The objectives of efficiently removing the organic matter stick on the (Continued)

surface of the substrate and preventing the static damage to the circuit pattern of the substrate can be achieved. Thus, the quality and the yield of the productions can be promoted.

11 Claims, 5 Drawing Sheets

(51) Int. Cl.
*G02F 1/1368* (2006.01)
*G02F 1/13* (2006.01)
*G02F 1/1333* (2006.01)

(56) References Cited

U.S. PATENT DOCUMENTS

| | | | |
|---|---|---|---|
| 7,045,746 B2* | 5/2006 | Devine | F27B 17/0025 |
| | | | 118/50.1 |
| 8,242,460 B2* | 8/2012 | Yue | B08B 7/0042 |
| | | | 250/455.11 |
| 8,426,778 B1* | 4/2013 | Bolt | B05D 3/067 |
| | | | 219/405 |
| 8,584,612 B2* | 11/2013 | Hart | H01L 21/02041 |
| | | | 118/50.1 |
| 2004/0173237 A1* | 9/2004 | Park | B08B 7/0057 |
| | | | 134/1.3 |
| 2011/0146705 A1* | 6/2011 | Hart | H01L 21/67115 |
| | | | 134/2 |

* cited by examiner

METHOD OF CLEANING SUBSTRATE BY ULTRAVIOLET RAYS WITH ADJUSTABLE RADIATION ENERGY

FIELD OF THE INVENTION

The present invention relates to a manufacture skill of a liquid crystal display, and more particularly to a method of cleaning a substrate by ultraviolet rays with adjustable radiation energy.

BACKGROUND OF THE INVENTION

LCD (Liquid Crystal Display) possesses advantages of being ultra thin, power saved and radiation free. It has been widely utilized in, such as mobile phones, PDAs (personal digital assistance), digital cameras, laptop screens or notebook screens.

The present thin film transistor liquid crystal display comprises a shell, a LCD panel located in the shell and a backlight module located in the shell. Particularly, the structure of the LCD panel can comprise a TFT Array Substrate (Thin Film Transistor Array Substrate), a CF (Color Filter) and a Liquid Crystal Layer. The working principle is that the light of backlight module is reflected to generate images by applying driving voltages to the two glass substrate for controlling the rotations of the liquid crystal molecules.

The manufacture processes of the thin film transistor liquid crystal display comprises an Array process of the front end, which mainly a TFT substrate and a CF substrate are manufacture; a cell process in the middle, which mainly the TFT substrate and the CF substrate are laminated and liquid crystal is filled therebetween for forming a LCD panel; and a module assembly process of back end, which mainly the LCD panel, the backlight module, a PCB and other components are assembled. In the Array process of the front end and the cell process in the middle, the substrate requires cleaning many times for cleaning the organic matter stick on the surface of the substrate and guaranteeing the substrate spotless. For now, a widely used method of cleaning a substrate is to clean the substrate by ultraviolet rays with photosensitized oxidation of the organic matter. The irradiating wavelength of the ultraviolet ray light is 185 nm and 254 nm which contain high energy. When the light waves reach the surface of the substrate, the organic matter absorbs the energy of the ultraviolet rays with 185 nm wavelength and disaggregates into ions, ionized atoms, excited molecules and neutrons because most of the organic matters have stronger absorbency to the ultraviolet rays with 185 nm wavelength. When the oxygen molecules in the air absorb the ultraviolet rays with 254 nm wavelength, ozone and atomic oxygen are generated. Still, the ozone also have strong absorbency to the ultraviolet rays and then the ozone disaggregates into atomic oxygen and oxygen gas in advance. With the effect of the atomic oxygen, the analyte of the organic matter can be compounded as volatilizable gas, such as carbon dioxide, water vapor and etc. and detached from the surface of the substrate. The cleaning of the organic matter is achieved and a spotless substrate is guaranteed. The specific implement is an ultraviolet ray light is positioned above the substrate. The substrate is moved by a roller conveyer. The ultraviolet rays directly irradiate on the substrate to remove the organic matter. Nevertheless, during this cleaning process, the energy of the ultraviolet rays cannot be flexibly adjusted. Particularly, as the ultraviolet rays are employed for cleaning the TFT substrate, the ultraviolet rays with high energy can easily excite the electrons of the metal layer in the substrate to create massive statics. Ultimately, the static damage can caused to the circuit pattern of the substrate. The quality and the yield of the productions are affected.

Consequently, there is a need for an improved method of cleaning a substrate which is capable of efficiently removing the organic matter stick on the surface of the substrate and preventing the static damage to the circuit pattern of the substrate.

SUMMARY OF THE INVENTION

An objective of the present invention is to provide a method of cleaning a substrate by ultraviolet rays with adjustable radiation energy. With the method, the radiation energy of the ultraviolet rays for cleaning the substrate can be flexibly adjusted. The objectives of efficiently removing the organic matter stick on the surface of the substrate and preventing the static damage to the circuit pattern of the substrate can be achieved. Thus, the quality and the yield of the productions can be promoted.

For realizing the aforesaid objective, the present invention provides a method of cleaning a substrate by ultraviolet rays with adjustable radiation energy, comprising steps of:

step 1, providing an ultraviolet ray light and a substrate to be cleaned with the ultraviolet rays;

step 2, locating several shading plates between the ultraviolet ray light and the substrate to be cleaned with the ultraviolet rays;

step 3, rotating the shading plates to adjust an area of the substrate irradiated with the ultraviolet rays emitted by the ultraviolet ray light and thus to control the radiation energy on the substrate in the unit time;

step 4, cleaning the substrate with the ultraviolet rays emitted by the ultraviolet ray light.

Each of the shading plates in the step 2 is black.

Each of the shading plates in the step 2 is a strip-shaped thin plate.

The shading plates in the step 2 are located in the middle of the ultraviolet ray light and the substrate.

The shading plates in the step 2 are perpendicular to the ultraviolet ray light.

The substrate in the step 4 is moved relative to the ultraviolet ray light, and the lengths of the shading plates are parallel with the moving direction of the substrate.

Rotating the shading plates in the step 3 is achieved by gears installed on the shading plates with motor drive.

The gears are connected to the shading plates with connection shafts, and the gears are installed on bearings, and the bearings are installed with back shafts, and thus the shading plates are rotated relative to the back shafts.

The shading plates are rotated between 0 degree and 90 degrees.

The substrate is a glass substrate of a thin film transistor liquid crystal display.

The present invention further provides a method of cleaning a substrate by ultraviolet rays with adjustable radiation energy, comprising steps of:

step 1, providing an ultraviolet ray light and a substrate to be cleaned with the ultraviolet rays;

step 2, locating several shading plates between the ultraviolet ray light and the substrate to be cleaned with the ultraviolet rays;

step 3, rotating the shading plates to adjust an area of the substrate irradiated with the ultraviolet rays emitted by the ultraviolet ray light and thus to control the radiation energy on the substrate in the unit time;

step 4, cleaning the substrate with the ultraviolet rays emitted by the ultraviolet ray light;

wherein each of the shading plates in the step 2 is black;

wherein the each of the shading plates in the step 2 is a strip-shaped thin plate;

wherein the shading plates in the step 2 are located in the middle of the ultraviolet ray light and the substrate;

wherein the shading plates in the step 2 are perpendicular to the ultraviolet ray light;

wherein rotating the shading plates in the step 3 is achieved by gears installed on the shading plates with motor drive;

wherein the substrate in the step 4 is moved relative to the ultraviolet ray light, and the lengths of the shading plates are parallel with the moving direction of the substrate;

wherein the gears are connected to the shading plates with connection shafts, and the gears are installed on bearings, and the bearings are installed with back shafts, and thus the shading plates are rotated relative to the back shafts (80);

wherein the shading plates are rotated between 0 degree and 90 degrees;

wherein the substrate is a glass substrate of a thin film transistor liquid crystal display.

The benefits of the present invention are: several shading plates are located between the ultraviolet ray light and the substrate according to the method of cleaning the substrate by ultraviolet rays with adjustable radiation energy according to the present invention. By rotating the shading plates to different angles, an area of the substrate irradiated with the ultraviolet rays emitted by the ultraviolet ray light can be adjusted and thus the radiation energy on the substrate in the unit time can be controlled. It is possible to efficiently remove the organic matter stick on the surface of the substrate to clean the substrate and to prevent the static damage to the circuit pattern of the substrate. The method is flexibly operated and convenient. The quality and the yield of the productions can be promoted.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution, as well as beneficial advantages, of the present invention will be apparent from the following detailed description of an embodiment of the present invention, with reference to the attached drawings.

DETAILED DESCRIPTION OF PREFERRED EMBODIMENTS

Embodiments of the present invention are described in detail with the technical matters, structural features, achieved objects, and effects with reference to the accompanying drawings as follows.

Please refer from FIG. 1 to FIG. 9. The present invention provides a method of cleaning a substrate by ultraviolet rays with adjustable radiation energy, comprising steps of:

step 1, providing an ultraviolet ray light (10) and a substrate (20) to be cleaned with the ultraviolet rays;

step 2, locating several shading plates (30) between the ultraviolet ray light (10) and the substrate (20) to be cleaned with the ultraviolet rays;

step 3, rotating the shading plates (30) to adjust an area of the substrate (20) irradiated with the ultraviolet rays emitted by the ultraviolet ray light (10) and thus to control the radiation energy on the substrate (20) in the unit time;

step 4, cleaning the substrate (20) with the ultraviolet rays emitted by the ultraviolet ray light (10).

Figure 1:
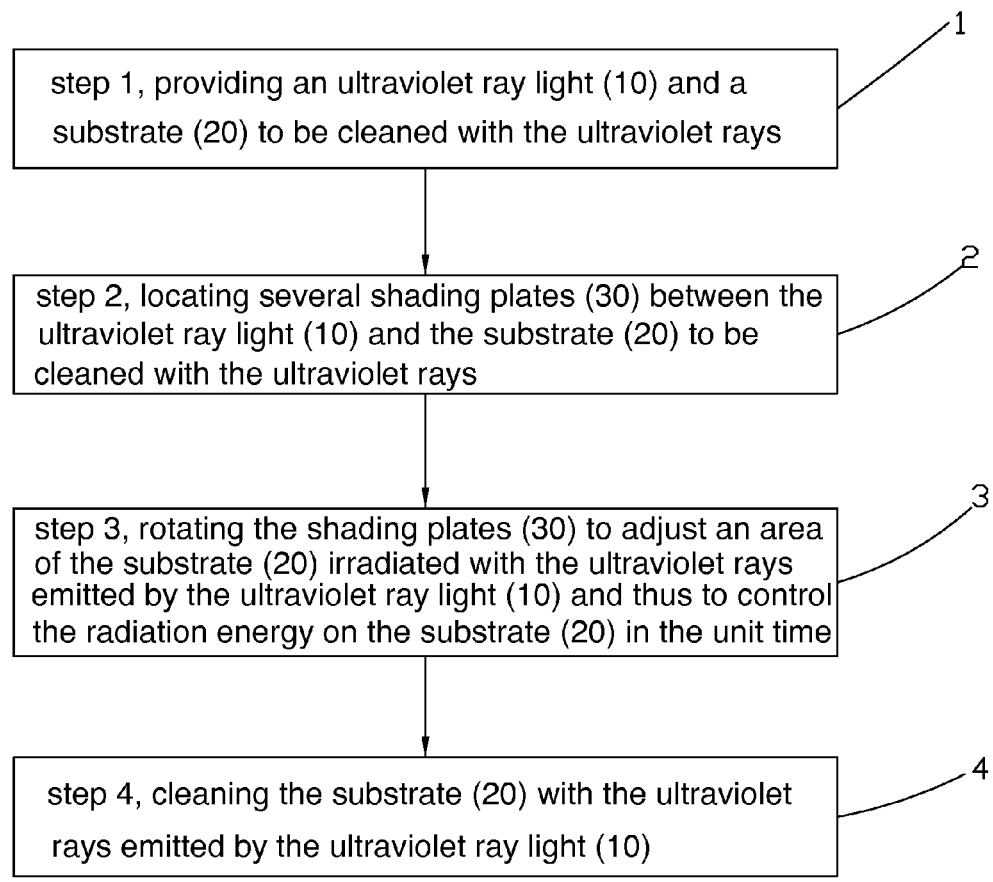
FIG. 1 is a flowchart of a method of cleaning a substrate by ultraviolet rays with adjustable radiation energy according to the present invention.
Figure 2:
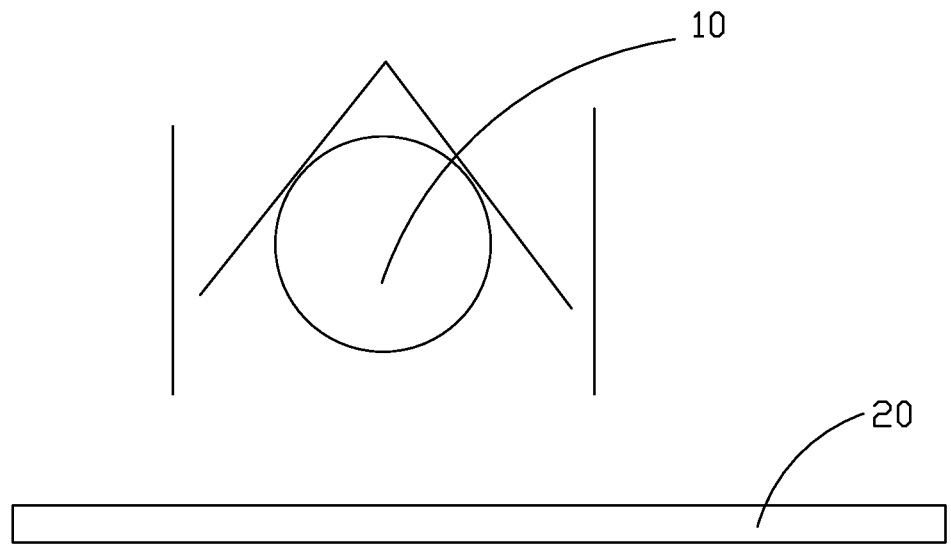
FIG. 2 is a diagram showing the step 1 of the method of cleaning the substrate by ultraviolet rays with adjustable radiation energy according to the present invention.

Specifically, please refer to FIG. 2. The ultraviolet ray light 10 provided in the step 1 can be a low pressure mercury lamp or an excimer lamp as being a light source for emitting ultraviolet rays; the substrate to be cleaned is a glass substrate of a thin film transistor liquid crystal display.

Figure 3:
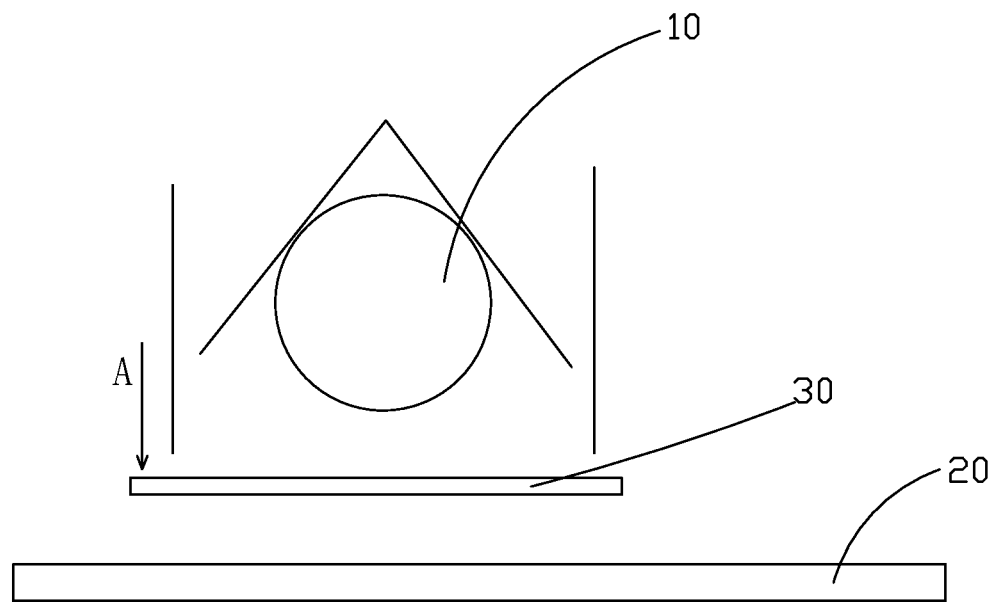
FIG. 3 is a diagram showing the step 2 of the method of cleaning the substrate by ultraviolet rays with adjustable radiation energy according to the present invention.
Figure 4:
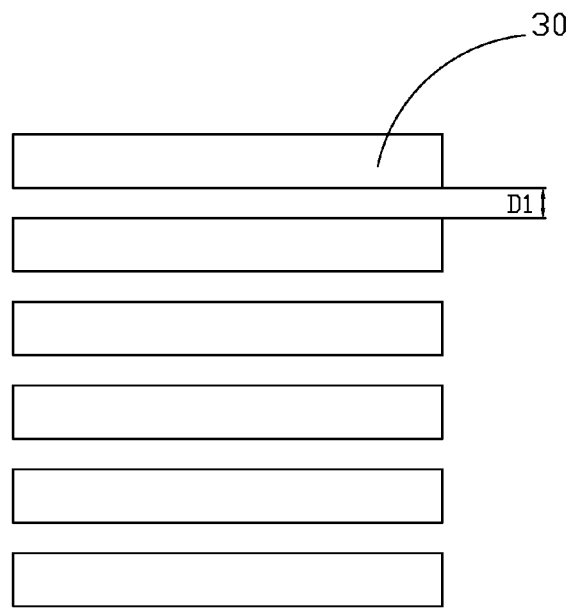
FIG. 4 is a diagram from a view of A direction shown in FIG. 3.

Please refer to FIG. 3 and FIG. 4. The step 2 is to locate several shading plates 30 between the ultraviolet ray light 10 and the substrate 20 to be cleaned with the ultraviolet rays. Preferably, the shading plates 30 are located in the middle of the ultraviolet ray light 10 and the substrate 20 to be cleaned; each of the shading plates 30 is a black strip-shaped thin plate, and the several shading plates 30 are arranged in parallel. The amount thereof can be decided according to the specific dimension of the substrate 20 to be cleaned with the ultraviolet rays; in this step, the several shading plates 30 are perpendicular to the ultraviolet ray light 10, and the several shading plates 30 are horizontally located. Preferably, a gap exists between the each two adjacent shading plates 30 and the distance of the gap is D1.

Figure 5:
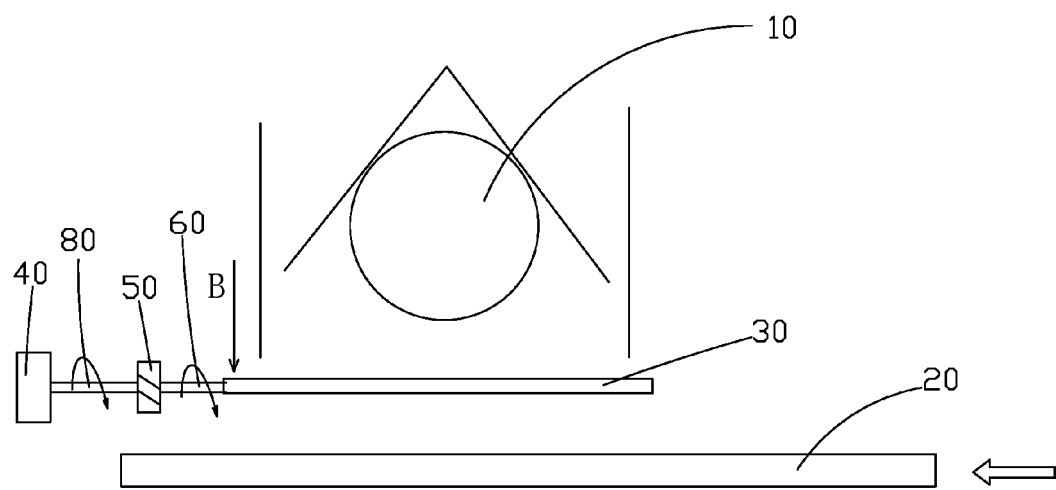
FIG. 5 is a diagram showing the step 3 of the method of cleaning the substrate by ultraviolet rays with adjustable radiation energy according to the present invention.
Figure 6:
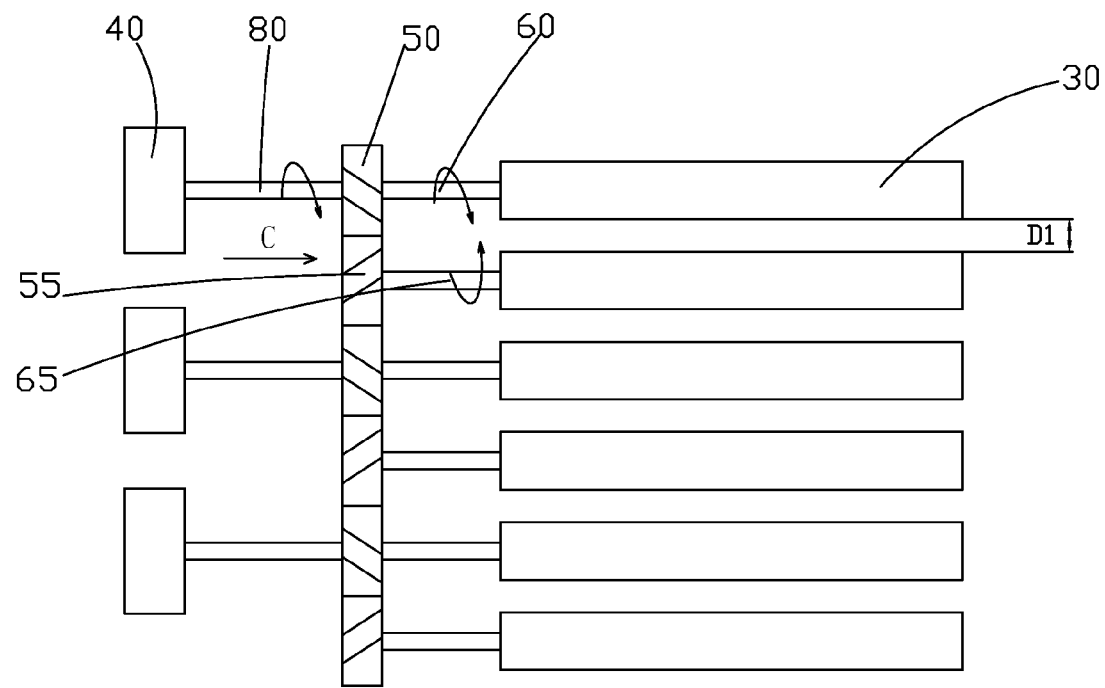
FIG. 6 is a diagram of shading plates, motor, connection shafts, back shafts and gears from a view of B direction shown in FIG. 5.
Figure 7:
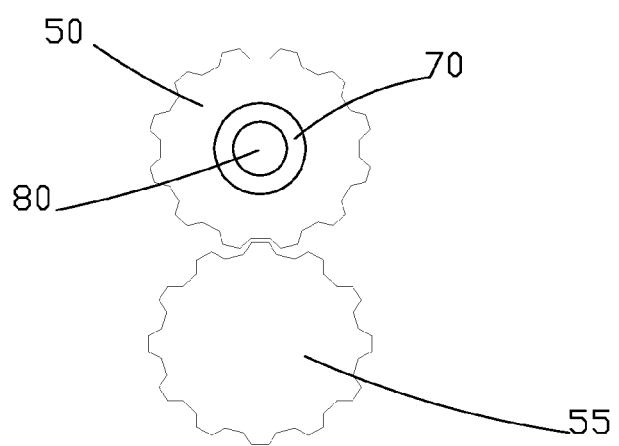
FIG. 7 is a diagram of the gears from a view of C direction shown in FIG. 6.
Figure 8:
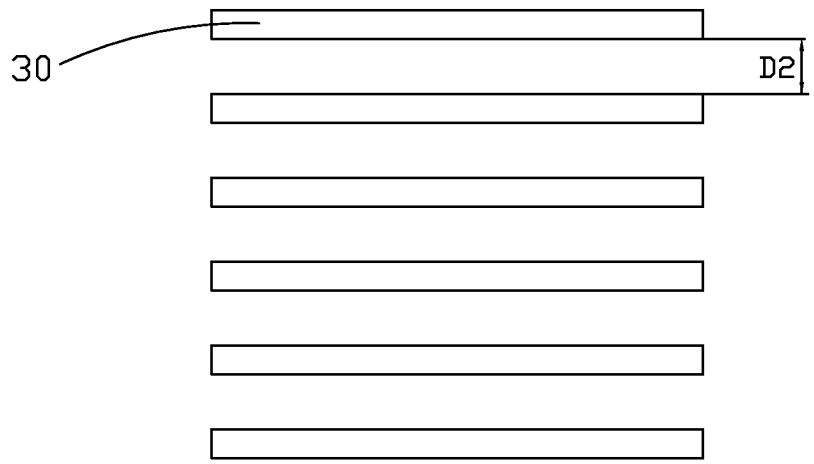
FIG. 8 is a diagram showing the shading plates rotated to 45 degrees in the step 3 of the method of cleaning the substrate by ultraviolet rays with adjustable radiation energy according to the present invention.
Figure 9:
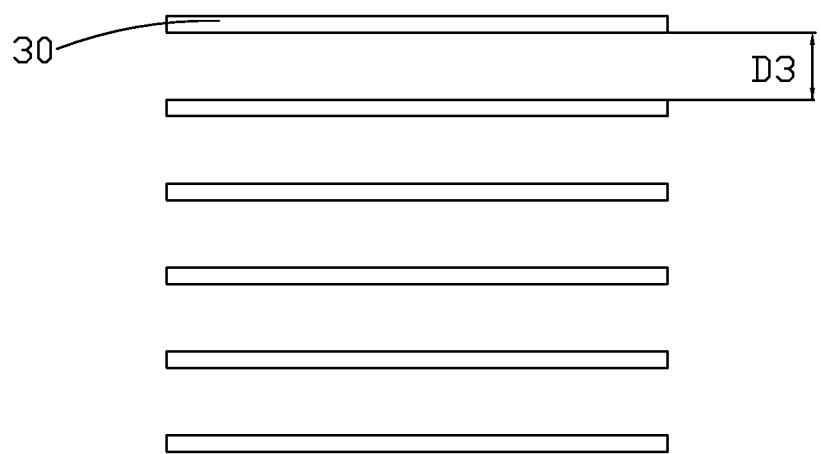
FIG. 9 is a diagram showing the shading plates rotated to 90 degrees in the step 3 of the method of cleaning the substrate by ultraviolet rays with adjustable radiation energy according to the present invention.

Please refer to FIG. 5, FIG. 6 and FIG. 7. The step 3 is to rotate the shading plates 30 to adjust an area of the substrate 20 irradiated with the ultraviolet rays emitted by the ultraviolet ray light 10 and thus to control the radiation energy on the substrate 20 in the unit time. Rotating the shading plates 30 is achieved by gears 50 installed on the shading plates 30 with motor 40 drive. Moreover, the gears 50 are connected to the shading plates 30 with connection shafts 60, and the gears 50 are installed on bearings 70, and the bearings 70 are installed with back shafts 80. Thus the shading plates 30 are rotated relative to the back shafts 80 and the back shaft 80 are connected to the motor 40. For saving power and manufacture cost, driven gears 55 can be located. The driven gears 55 are engaged with the gears 50 and connected to the shading plates 30 with other connection shafts 65. Accordingly, the gears can drive the driven gears 55 and the shading plates 30 to be rotated. The specific implement of this step is: the rotating angle of the shading plates 30 are 0 degree before the motors 40 are turned on. The shading plates 30 are perpendicular to the ultraviolet ray light 10. The gap between each two adjacent shading plates 30 is the minimum distance D1. At this moment, the area of the ultraviolet rays emitted from the ultraviolet ray light 10 shielded by the shading plates 30 is largest and the irradiated area of the substrate 20 through the gaps with distances D1 is smallest. The radiation energy of the ultraviolet rays conveyed on the substrate 20 in the unit time is smallest; after the motors 40 are turned on, the motors 40 drive the back shafts 80 and the bearings 70 to rotate and drive the connection shafts 60, the gears 55 and other connection shafts 65. Accordingly, the corresponding shading plates 30 fixedly connected to the connection shafts 60 and other connection shafts 65 are rotated between 0 degree and 90 degrees. As shown in FIG. 8, as the shading plates 30 are rotated to 45 degrees, the distance of the gap between each two adjacent shading plates 30 is increased to D2. The area of the ultraviolet rays emitted from the ultraviolet ray light 10 shielded by the shading plates 30 is decreased and the irradiated area of the substrate 20 through the gaps with distances D2 is increased. Accordingly, the radiation energy of the ultraviolet rays conveyed on the substrate 20 in the unit time becomes larger; as shown in FIG. 9, as the shading plates 30 are rotated to 90 degrees, the distance of the gap between each two adjacent shading plates 30 is increased to be the maximum distance D3. The area of the ultraviolet rays emitted from the ultraviolet ray light 10 shielded by the shading plates 30 is decreased to be smallest and the irradiated area of the substrate 20 through the gaps with distances D3 is increased to be the largest. Accordingly, the radiation energy of the ultraviolet rays conveyed on the substrate 20 in the unit time becomes the largest. In combination with other processes including the array of front end and the cell in the middle, based on the real condition of the organic matter stick on the surface of the substrate 20, the shading plates 30 are flexibly to be rotated between 0 degree and 90 degrees by controlling the motor 40 and the radiation energy of the ultraviolet rays conveyed on the substrate 20 in the unit time is controllable. Therefore, the proper radiation energy of the ultraviolet rays can be managed for cleaning the substrate 20. It is possible to efficiently remove the organic matter stick on the surface of the substrate to clean the substrate and thus, to prevent the static damage to the circuit pattern of the substrate.

The specific implement of the step 4 is, the substrate 20 can be moved relative to the ultraviolet ray light 10 by a roller conveyer (not shown). The ultraviolet ray light 10 emits the ultraviolet rays to clean the substrate 20. Specifically, the lengths of the shading plates 30 are parallel with the moving direction of the substrate 20.

In conclusion, provided with a method of cleaning a substrate by ultraviolet rays with adjustable radiation energy according to the present invention, several shading plates are located between the ultraviolet ray light and the substrate according to the method of cleaning the substrate by ultraviolet rays with adjustable radiation energy according to the present invention. By rotating the shading plates to different angles, an area of the substrate irradiated with the ultraviolet rays emitted by the ultraviolet ray light can be adjusted and thus the radiation energy on the substrate in the unit time can be controlled. It is possible to efficiently remove the organic matter stick on the surface of the substrate to clean the substrate and to prevent the static damage to the circuit pattern of the substrate. The method is flexibly operated and convenient. The quality and the yield of the productions can be promoted.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A method of cleaning a substrate by ultraviolet rays with adjustable radiation energy, comprising the following steps:
    step 1, providing an ultraviolet ray light that emits ultraviolet rays and a substrate to be cleaned with the ultraviolet rays;
    step 2, locating shading plates between the ultraviolet ray light and the substrate to be cleaned with the ultraviolet rays emitting from the ultraviolet ray light irradiating through a spacing gap between the shading plates toward an area of the substrate that corresponds to the spacing gap between the shading plates;
    step 3, rotating the shading plates about rotation axes respectively that extend in a predetermined direction between a first angular position where the spacing gap between the shading plates is of a minimum value and a second angular position where the spacing gap between the shading plates is of a maximum value to adjust a size of the area of the substrate irradiated with the ultraviolet rays emitting from the ultraviolet ray light so as to control radiation energy carrying by the ultraviolet rays impinging on the substrate in a predetermined period of time; and
    step 4, cleaning the substrate with the radiation energy carried by the ultraviolet rays emitting from the ultraviolet ray light and irradiated through the spacing gap between the shading plates, wherein the substrate is movable relative to ultraviolet ray light between a first location and a second location spaced from the first location;
    wherein the minimum value of the spacing gap between the shading plates at the first angular position is a predetermined value with which the shading plates are kept separate from each other to allow the substrate to be kept irradiated with the ultraviolet rays.

2. The method of cleaning the substrate by ultraviolet rays with adjustable radiation energy according to claim 1, wherein each of the shading plates is black.

3. The method of cleaning the substrate by ultraviolet rays with adjustable radiation energy according to claim 1, wherein each of the shading plates is a strip-shaped thin plate having a length extending in the predetermined direction in which the rotation axes of the shading plates extend.

4. The method of cleaning the substrate by ultraviolet rays with adjustable radiation energy according to claim 1, wherein the rotation axes of the shading plates are located in a position midway between the ultraviolet ray light and the substrate.

5. The method of cleaning the substrate by ultraviolet rays with adjustable radiation energy according to claim 1, wherein the shading plates have surfaces that are substantially perpendicular to the ultraviolet rays emitting from the ultraviolet ray light in the first angular position.

6. The method of cleaning the substrate by ultraviolet rays with adjustable radiation energy according to claim 1, wherein the movement of the substrate relative to the ultraviolet ray light from the first location to the second location is conducted in the predetermined direction in which the rotation axes of the shading plates extend.

7. The method of cleaning the substrate by ultraviolet rays with adjustable radiation energy according to claim 1, wherein rotating the shading plates is achieved by a motor driving gears connected to the shading plates.

8. The method of cleaning the substrate by ultraviolet rays with adjustable radiation energy according to claim 7, wherein the gears are connected to the shading plates with connection shafts, and the gears are operatively coupled to the motor such that operation of the motor drives the gears that in turn drive the shading plates to rotate between the first and second angular positions.

9. The method of cleaning the substrate by ultraviolet rays with adjustable radiation energy according to claim 1, wherein the first angular position of the shading plates is such that surfaces of the shading plates that face the ultraviolet light are set as 0 degree and the second angular position is such that the surfaces of the shading plates are set as 90 degrees so as to be substantially perpendicular to the first angular position.

10. The method of cleaning the substrate by ultraviolet rays with adjustable radiation energy according to claim 1, wherein the substrate is a glass substrate of a thin film transistor liquid crystal display.

11. A method of cleaning a substrate by ultraviolet rays with adjustable radiation energy, comprising the following steps:
   step 1, providing an ultraviolet ray light that emits ultraviolet rays and a substrate to be cleaned with the ultraviolet rays;
   step 2, locating shading plates between the ultraviolet ray light and the substrate to be cleaned with the ultraviolet rays emitting from the ultraviolet ray light irradiating through a spacing gap between the shading plates toward an area of the substrate that corresponds to the spacing gap between the shading plates;
   step 3, rotating the shading plates about rotation axes respectively that extend in a predetermined direction between a first angular position where the spacing gap between the shading plates is of a minimum value and a second angular position where the spacing gap between the shading plates is of a maximum value to adjust a size of the area of the substrate irradiated with the ultraviolet rays emitting from the ultraviolet ray light so as to control radiation energy carrying by the ultraviolet rays impinging on the substrate in a predetermined period of time; and
   step 4, cleaning the substrate with the radiation energy carried by the ultraviolet rays emitting from the ultraviolet ray light and irradiated through the spacing gap between the shading plates, wherein the substrate is movable relative to ultraviolet ray light between a first location and a second location spaced from the first location;
wherein the minimum value of the spacing gap between the shading plates at the first angular position is a predetermined value with which the shading plates are kept separate from each other to allow the substrate to be kept irradiated with the ultraviolet rays;
wherein each of the shading plates is black;
wherein each of the shading plates is a strip-shaped thin plate having a length extending in the predetermined direction in which the rotation axes of the shading plates extend;
wherein the rotation axes of the shading plates are located in a position midway between the ultraviolet ray light and the substrate;
wherein the shading plates have surfaces that are substantially perpendicular to the ultraviolet rays emitting from the ultraviolet ray light in the first angular position;
wherein rotating the shading plates is achieved by a motor driving gears connected to the shading plates;
wherein the movement of the substrate relative to the ultraviolet ray light from the first location to the second location is conducted in the predetermined direction in which the rotation axes of the shading plates extend;
wherein the gears are connected to the shading plates with connection shafts, and the gears are operatively coupled to the motor such that operation of the motor drives the gears that in turn drive the shading plates to rotate between the first and second angular positions;
wherein the first angular position of the shading plates is such that surfaces of the shading plates that face the ultraviolet light are set as 0 degree and the second angular position is such that the surfaces of the shading plates are set as 90 degrees so as to be substantially perpendicular to the first angular position; and
wherein the substrate is a glass substrate of a thin film transistor liquid crystal display.

* * * * *